(12) United States Patent
Cauchy et al.

(10) Patent No.: US 6,295,820 B1
(45) Date of Patent: Oct. 2, 2001

(54) FRUIT CHILLER

(75) Inventors: Charles J. Cauchy, Traverse City, MI (US); George A. Clark, Lewis Center, OH (US); Mark S. Thompson, Milwaukee; Douglas P. Gundlach, Racine, both of WI (US); Dan M. Bruner, Powell, OH (US)

(73) Assignee: Delta T, LLC, Racine, WI (US)

( * ) Notice: Subject to any disclaimer, the term of this patent is extended or adjusted under 35 U.S.C. 154(b) by 0 days.

(21) Appl. No.: 09/525,140

(22) Filed: Mar. 14, 2000

(51) Int. Cl.$^7$ .................................................. F25B 21/02
(52) U.S. Cl. .............................................. 62/3.6; 62/457.9
(58) Field of Search ................................ 62/3.6, 3.2, 3.3, 62/3.62, 457.9, 457.6, 3.7, 371

(56) References Cited

U.S. PATENT DOCUMENTS

| | | |
|---|---|---|
| 3,040,539 | 6/1962 | Gaugler . |
| 4,326,383 | 4/1982 | Reed et al. . |
| 4,823,554 | 4/1989 | Trachtenberg et al. . |
| 5,042,258 | 8/1991 | Sundhar . |
| 5,111,664 * | 5/1992 | Yang ..................................... 62/3.62 |
| 5,209,069 * | 5/1993 | Newnan ................................ 62/3.64 |
| 5,247,798 | 9/1993 | Collard, Jr. . |
| 5,315,830 | 5/1994 | Doke et al. . |
| 5,423,194 | 6/1995 | Senecal . |
| 5,448,109 | 9/1995 | Cauchy . |
| 5,661,979 | 9/1997 | DeBoer . |
| 5,718,124 | 2/1998 | Senecal . |
| 5,782,094 * | 7/1998 | Freeman ................................. 62/3.6 |
| 5,941,077 * | 8/1999 | Safyan ................................... 62/3.3 |
| 6,119,463 * | 9/2000 | Bell ........................................ 62/3.7 |

FOREIGN PATENT DOCUMENTS

4028658-A1 * 3/1991 (DE) .

* cited by examiner

*Primary Examiner*—Henry Bennett
*Assistant Examiner*—Chen-Wen Jiang
(74) *Attorney, Agent, or Firm*—Andrus, Sceales, Starke & Sawall

(57) ABSTRACT

A chiller for fresh fruit and other perishable food products is cooled with a thermoelectric device and includes a cool air recirculating system that minimizes air flow path lengths and provides uniform cool air distribution throughout a fruit container removably supported above the thermoelectric module. The cooling air flow duct system is formed in part by the bottom wall of the container, thereby enhancing direct cooling air flow contact in minimizing the lengths of the flow paths.

32 Claims, 4 Drawing Sheets

FRUIT CHILLER

BACKGROUND OF THE INVENTION

The present invention relates to a device for chilling fresh fruit and other fresh food products and, more particularly, to an improved countertop fruit chiller utilizing a Peltier effect thermoelectric device.

Thermoelectric devices operating in accordance with the well known Peltier effect have been used as cooling/heating devices for many years. Such a thermoelectric device comprises an array of semiconductor couples connected electrically in series and thermally in parallel. The semiconductor couples are sandwiched between metalized ceramic substrates. When DC electric current is applied in series to the thermoelectric device, it acts as a heat pump with heat being absorbed on the cold side, thereby cooling it, while heat is dissipated at the other side, where the temperature rises. Reversing the current causes the direction of heat flow to be reversed. The efficiency of the thermoelectric device may be enhanced by attaching a heat sink and a cold sink to the respective hot and cold sides.

Peltier effect devices have long been used to provide coolers and/or heaters for keeping foods fresh or for warming foods for serving. It has also been found and is well known to use forced air convection to aid in heat transfer. A small electric fan is typically used to circulate air past the cold sink and into and through a container for the food, while another fan moves ambient outside air across the heat sink to dissipate heat from it.

Although chillers for fresh fruit and other perishable food products are well known in the art, the market success of such devices has been limited. There appear to be a number of reasons for this lack of market success. One is the cost and heat transfer efficiency of the solid state thermoelectric modules. In addition, such prior art modules have typically been quite fragile, exhibiting low mechanical strength. In addition, the need to provide circulation of cool air to attain the greatest cooling efficiency, has led to complex duct systems which add substantially to the cost of the containers, typically made of molded plastic materials. Long air circulation flow paths also result in heat loss and pressure drop, both of which decrease the efficiency or add to the cost by requiring larger thermoelectric modules.

SUMMARY OF THE INVENTION

In accordance with the present invention, a chiller for fresh fruit or other perishable food products utilizes a construction which optimizes a cooling air flow and thus heat transfer efficiency with a container construction that is less expensive to manufacture and permitting the use of a relatively smaller thermoelectric module. Thermoelectric modules of increased efficiency and improved mechanical strength, such as disclosed in U.S. Pat. No. 5,448,109, are particularly suitable for use in the fruit chiller of the subject invention.

In its broadest aspect, the food chiller of the present invention comprises a supporting base that includes a housing for mounting a Peltier effect thermoelectric module sandwiched between a cold sink and an opposite heat sink. The housing also defines an upwardly opening cooling duct system that includes a cool air supply duct in heat transfer communication with the cold sink, a return air duct, and a cool air circulation fan in the cooling duct system to circulate air therethrough. A food container is supported on an upper peripheral edge of the housing, the container having an upper enclosing side wall above the peripheral edge of the housing and a lower bottom wall within said peripheral edge, the bottom wall forming an enclosing top wall for the duct system. The bottom wall has formed therein a plurality of inlet holes that communicate with the cool air supply duct and a plurality of outlet holes that communicate with the return air duct.

In one embodiment of the invention, one of the cooling system ducts is positioned to extend along an outer peripheral wall of the housing that includes the housing peripheral edge. The other of the ducts is centrally disposed within the first duct and separated from it by a generally vertically extending common dividing wall. The duct system also includes a cool air duct inlet, a return air duct outlet, and a recirculation passage that includes a circulation fan and the cold sink. The recirculation passage interconnects the cool air duct inlet and return air duct outlet. Preferably, the first outer duct comprises the cool air supply duct and has a generally horizontal lower enclosing wall that forms a common separating wall with the recirculation passage which is disposed below the separating wall. The cool air duct inlet is formed in the common separating wall adjacent the outer peripheral wall of the housing. The return air duct outlet is preferably also formed in the common separating wall. In a preferred embodiment, the common separating wall is generally horizontally disposed and generally parallel to the lower bottom wall of the container (also forming the top wall of the duct system and spaced vertically above the common separating wall).

In one alternate embodiment of the invention, the food container bottom wall includes a hollow central tower that extends vertically upwardly within the interior of the container. The central tower is provided with a plurality of holes which may comprise either the inlet holes for the cool air supply duct or the outlet holes for the return air duct. In this embodiment, the holes preferably comprise a hole pattern of increasing hole size in an upward direction along the tower.

In a presently preferred embodiment, the cooling duct system has a lower enclosing wall that forms a common separating wall with the recirculation passage disposed below the separating wall. Either of the cool air duct inlet or the return air duct outlet may be formed in the common separating wall immediately adjacent the outer peripheral wall of the housing. The plurality of inlet holes or outlet holes formed in the enclosing top wall of the duct that extends along the outer peripheral wall of the housing comprises a hole pattern of increasing hole size with increasing distance from the respective duct inlet or duct outlet. Preferably, the cool air supply duct is positioned along the outer peripheral wall of the housing.

The food container is removable from the housing and is provided with an annular outer edge seal between the upper peripheral edge of the housing and the lower edge of the enclosing side wall of the container. An annular inner seal is disposed between the upper edge of the common dividing wall and the underside of the container bottom wall. The outer seal may be attached to the upper peripheral edge of the housing and the inner seal to the underside of the bottom wall. Alternately, both outer and inner seals may be secured to the container bottom wall.

In the embodiment in which either the cold air duct inlet or the return air duct outlet is formed in the common horizontal separating wall adjacent the outer peripheral wall of the housing, the other outlet or inlet is also formed in the common separating wall in approximately the center thereof. The respective pluralities of inlet holes and outlet holes, in another embodiment, are interrupted to define solid wall portions that overlie the cool air duct inlet and the return air duct outlet to cover and protect the same from the ingress of debris.

The container is normally closed with a removable cover such that cooling air is continuously recirculated. In one embodiment, however, an outside ambient air supply conduit communicates with the recirculation passage and includes a metering device to admit a controlled flow of outside air to assist in purging the cooling duct system of ethylene gas and other ripening by-products of fruit. The metering device may comprise a small diameter tube connected to the recirculation passage upstream of the fan.

In the embodiment of the invention in which the food container includes a central tower, an auxiliary food tray may be demountably supported on the tower above the container bottom wall. The central tower is preferably tapered to decrease in diameter in the upward direction, and an auxiliary food tray provided with a center through hole is adapted to be placed over the central tower for demountable support thereon.

To help maintain the interior temperature of the container, a removable insulating sleeve may be inserted into the container. The sleeve is shaped to conform to the interior of the enclosing container side wall. The removable cover may also be provided with an insulating liner.

Various arrangements of partitions may be placed within the container to divide the container into different temperature zones by varying the flow of cooling air through the zones. Such partitions may be vertically disposed to extend upwardly from the container bottom wall or may be horizontally disposed and attached, for example, to a central tower or to the container side wall.

DETAILED DESCRIPTION OF THE PREFERRED EMBODIMENTS

Figure 1:
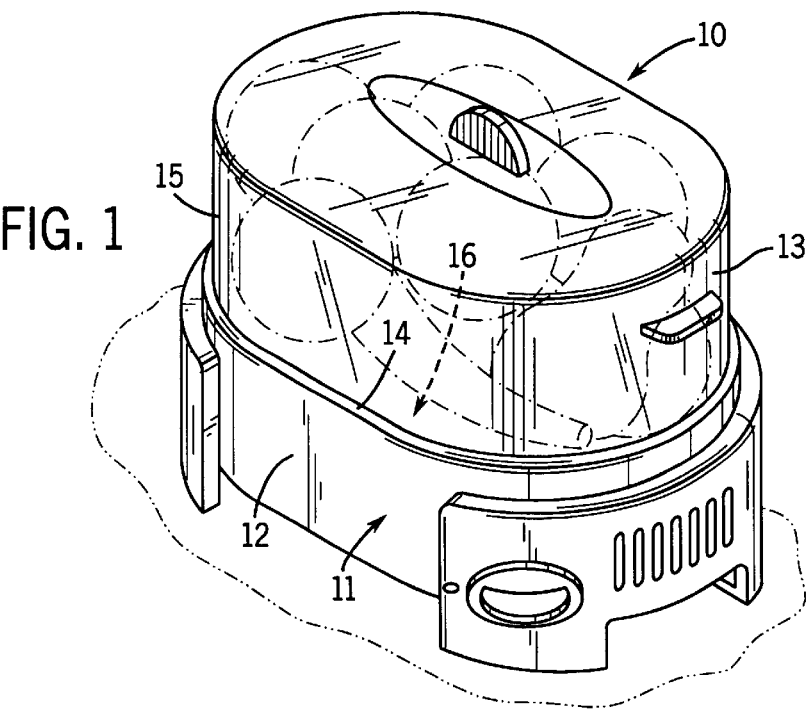
FIG. 1 is a perspective view showing the general arrangement of the fruit chiller of the subject invention.

In FIG. 1, there is shown a fruit chiller 10 in accordance with one embodiment of the present invention. The fruit chiller includes a supporting base 11 for supporting the chiller on a horizontal surface, with the base including a housing 12 for various components of the cooling system which will be described in detail hereinafter. A removable container 13 is seated on the upper peripheral edge 14 of the housing 12. The container has an upper enclosing side wall 15 extending above the peripheral edge 14 of the housing and a lower bottom wall 16 that is generally horizontal and lies within the peripheral edge 14 of the housing. The container 13 is closed by a removable cover 17. The base 11, including the housing 12, and the container 13 and cover 17 may all be made of injection molded plastic materials. The base 11 is preferably opaque and the container 13 and cover 17 transparent.

Figure 3:
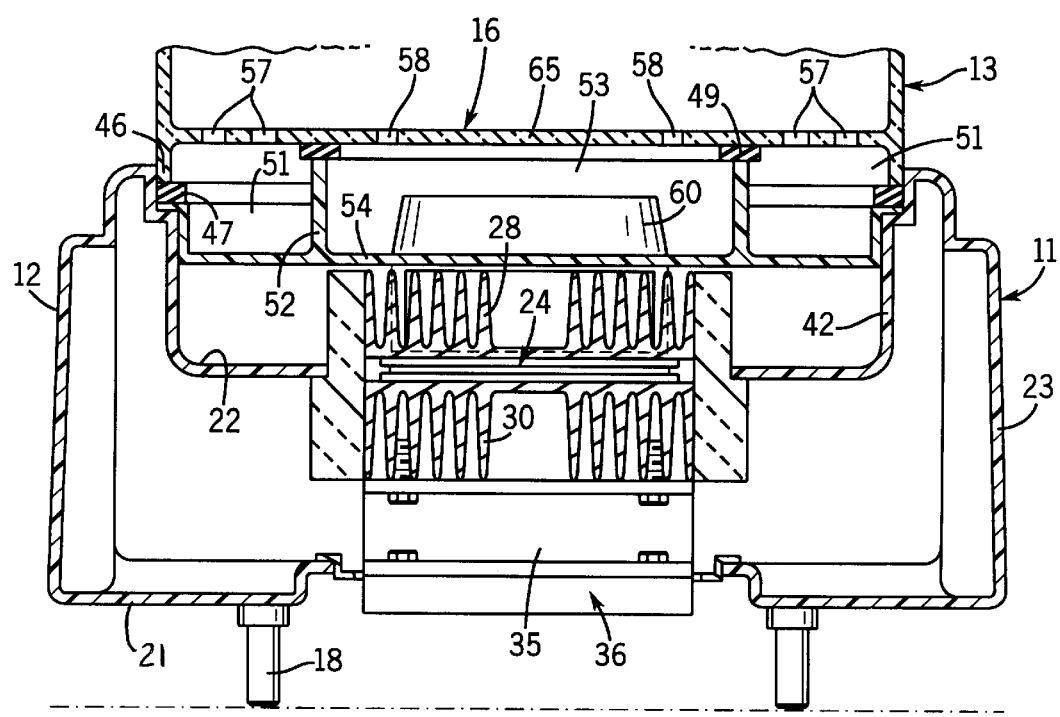
FIG. 3 is a vertical section taken on line 3—3 of FIG. 2.
Figure 2:
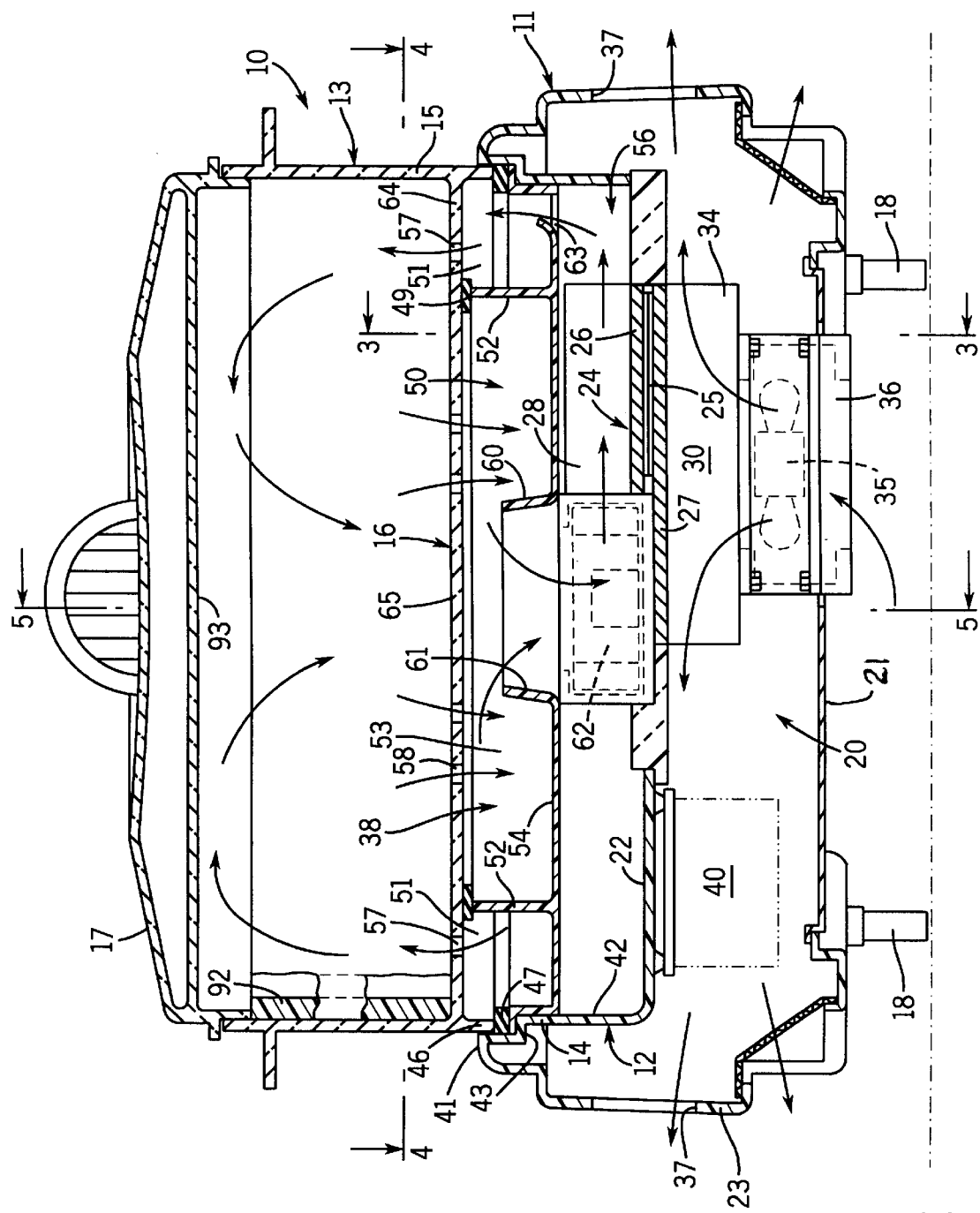
FIG. 2 is a vertical section through the fruit chiller shown in FIG. 1.
Figure 4:
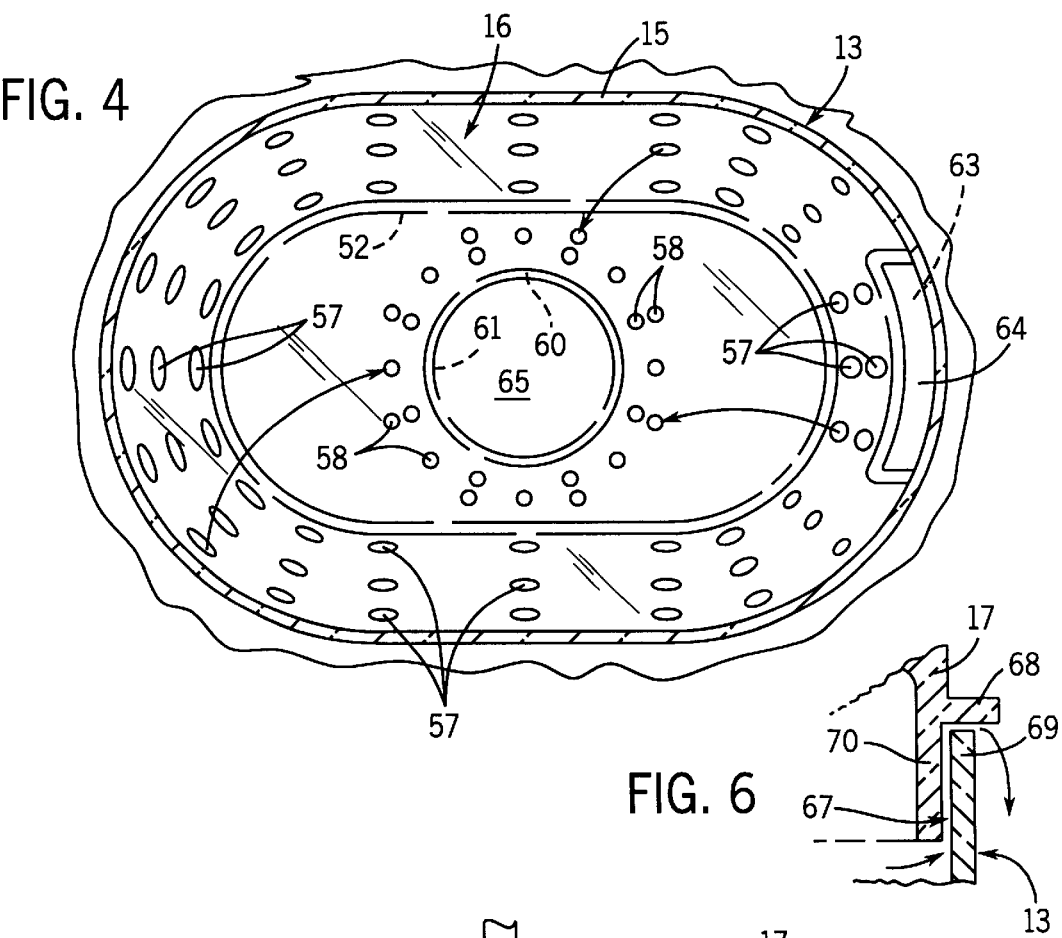
FIG. 4 is a top plan sectional view of the fruit chiller container taken on line 4—4 of FIG. 2.

Referring also to FIGS. 2–4, the base 11 is suitably supported on legs 18 to provide an open space beneath the base for the entry of ambient cooling air. The lower interior portion of the base 11 defines a substantially open ambient air chamber 20 defined generally by a base bottom wall 21, a base upper wall 22 and an enclosing base side wall 23. The container 13 and food products contained therein are cooled with a thermoelectric module 24 utilizing the well known Peltier effect. Referring particularly to FIG. 3, the thermoelectric module 24 is mounted in the base upper wall 22 and positioned generally horizontally in the plane of the upper wall. In accordance with generally conventional construction, the module 24 includes an array of semiconductor couples 25 sandwiched between upper and lower ceramic substrates 26 and 27 with layers of metalization interposed therebetween. By applying a DC current to the module, heat will be absorbed at one ceramic substrate (in this case the upper substrate 26), thereby cooling it, and heat will be dissipated at the other substrate (in this case lower ceramic substrate 27), thereby heating it. As is also well known in the prior art, a cold sink 28 is attached to the upper substrate 26 and a heat sink 30 is attached to the lower substrate 27. The cold sink 28 is typically made of aluminum and includes a base plate 31 and a series of parallel, closely spaced fins 32. Similarly, the heat sink 30 includes an aluminum base plate 33 and integral closely spaced parallel fins 34.

The heat rejected by the operating thermoelectric module 24 at the heat sink 30 is dissipated by a flow of ambient air through the ambient air chamber 20. To promote the heat dissipating flow of ambient air, a heat sink fan 35 is mounted on the base bottom wall 21 where it draws ambient air in through an ambient air inlet 36 directly below the fan. Ambient air from the fan 35 passes over the heat sink fins 34 and exits the air chamber 20 via ambient air outlets 37 formed in the side wall 23 of the base. An electronic control module 40 for controlling the supply of power to the thermoelectric module 24, the heat sink fan 35, and a cooling air fan (to be described) is also mounted in the ambient air chamber 20.

The side wall 23 of the base extends upwardly to an upper peripheral edge 41 which is joined by an annular horizontal shoulder 43 to the upper edge 14 of a vertically extending annular wall 42 that also forms the outer wall of a cooling air chamber 38. The cooling air chamber generally comprises the housing 12 for the system providing cooling air to the container 13. The container 13 is supported on the upper peripheral edge of the housing 12 on the recessed horizontal shoulder 43. The container 13 includes an upper enclosing side wall 15 which terminates in a lower edge 46 that seats on an annular foam rubber seal 47 on the horizontal shoulder 43. The container bottom wall 16 is formed integrally with and within the side wall 15, but spaced slightly above the side wall lower edge 46. The cooling air chamber 38, defined peripherally by the outer wall 42, is closed at the top by the bottom wall 16 of the container and the lower edge 46 of the container side wall. The container bottom wall 16 forms the top wall for a cooling duct system 50. The cooling duct system includes an outer cool air supply duct 51 extending along the outer peripheral wall 42 of the housing and enclosed radially inwardly by a continuous vertically disposed dividing wall 52 which also forms a common outer wall for an interior return air duct 53. The cooling duct system 50 (comprising the cool air supply air duct 51 and the return air duct 53) is generally enclosed at the bottom by a lower enclosing wall 54 that extends horizontally within the annular outer wall 42. The lower enclosing wall 54 of the cooling duct system 50 is also the upper wall of a recirculation passage 56 formed above and enclosed at the bottom by the upper wall 22 of the base.

The container bottom wall 16, which as indicated previously also provides the upper wall of the cooling duct system 50, includes a plurality of inlet holes 57 by which cool air in the cool air supply duct 51 is supplied to the interior of the container 13. The laterally interior portion of the container bottom wall 16 is provided with a plurality of outlet holes 58 allowing cooling air in the container interior to be returned for re-cooling. The top of the vertical dividing wall 52 is provided with an annular foam rubber seal 49 to prevent the short circuiting of cooling air from the cool air supply duct 51 to the return air duct 53. The center of the lower enclosing wall 54 is provided with an upwardly opening cylindrical sleeve 60 centered in the return air duct 53. The cylindrical sleeve 60 defines a return air duct outlet 61 through which air is drawn by a cold sink fan 62 to move the air through the recirculation passage 56. The bottom of the recirculation passage 56 is closed by the upper wall 22 of the base and the thermoelectric module 24 mounted therein. The cold sink fins 32 extend into the recirculation passage 56 where recirculating air, propelled by the cold sink fan 62, is cooled for return to the cool air supply duct 51. Cooled air is returned via a cool air duct inlet 63 formed in the lower wall 50 of the cooling duct system adjacent the outer wall of the housing.

To summarize the path of cooling air flow thus described, air within the container 13 is drawn into the return air duct through the outlet holes 58, exits the return air duct 53 via the return air duct outlet 61, passes through the cold sink fan 62 in the recirculation passage 56, past the cold sink fins 32 where the air is cooled, exits the recirculation passage and returns to the cool air supply duct 51 via the cool air duct inlet 63, and finally is returned into the container 13 via the inlet holes 57 in the outer peripheral surface of the container bottom wall 16. The entire cooling duct system 50 is characterized by a simple construction and short flow paths, and is further characterized by unique flow equalizing features as will be described below.

Referring particularly to FIG. 4, because the return air duct outlet 61 bringing cooled air into the cool air supply duct 51 is located near the outer wall at one end of the housing 12, cooling air might preferentially remain nearer that end and not adequately cool the opposite end of the container. To more equally and efficiently distribute the cool air, the inlet holes 57 in the outer peripheral portion of the container bottom wall 16 are formed to progressively increase in size as their distance from the return air duct outlet 61 increases. Alternately, the inlet holes 57 may be of equal size, but disbursed in an array that increases in hole density as the distance from the return air duct outlet increases. In this manner, the air flow from the cool air supply duct 51 upwardly through the holes 57 in the container bottom wall is more uniform, resulting in more uniform cooling temperature throughout the container.

It should be noted that by reversing the direction of the air flow, cooling air recirculation through the cooling duct system 50 may be reversed. Similarly, reversal of the contacts supplying DC current to the thermoelectric module 24 will reverse the heat pump function of the module so that the interior of the container may be heated. However, this is not a preferred function and a unit intended primarily for heating or warning would preferably include a number of structural changes.

To prevent the ingress of fruit juices, debris and other contaminants into the lower portion of the cooling duct system, a few practical expedients are utilized. In the container bottom wall 16 the pattern of inlet holes 57 is interrupted directly above the return air duct outlet 61 to define a solid wall portion 64. Similarly, the pattern of outlet holes 58 in the bottom wall is interrupted immediately above the cool air duct inlet 63 formed in the cylindrical sleeve 60 to define another solid wall portion 65. Any juices, debris or the like finding their way into the cool air supply duct 51 or the return air duct 53 are restricted from movement downwardly into the recirculation passage 56 by an upstanding lip forming the return air duct outlet 61 and the upwardly extending cylindrical sleeve 60.

Figure 6:
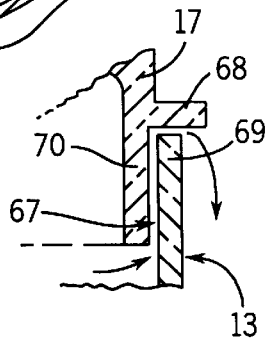
FIG. 6 is a sectional detail of FIG. 5 showing the interface between the container and the cover.
Figure 5:
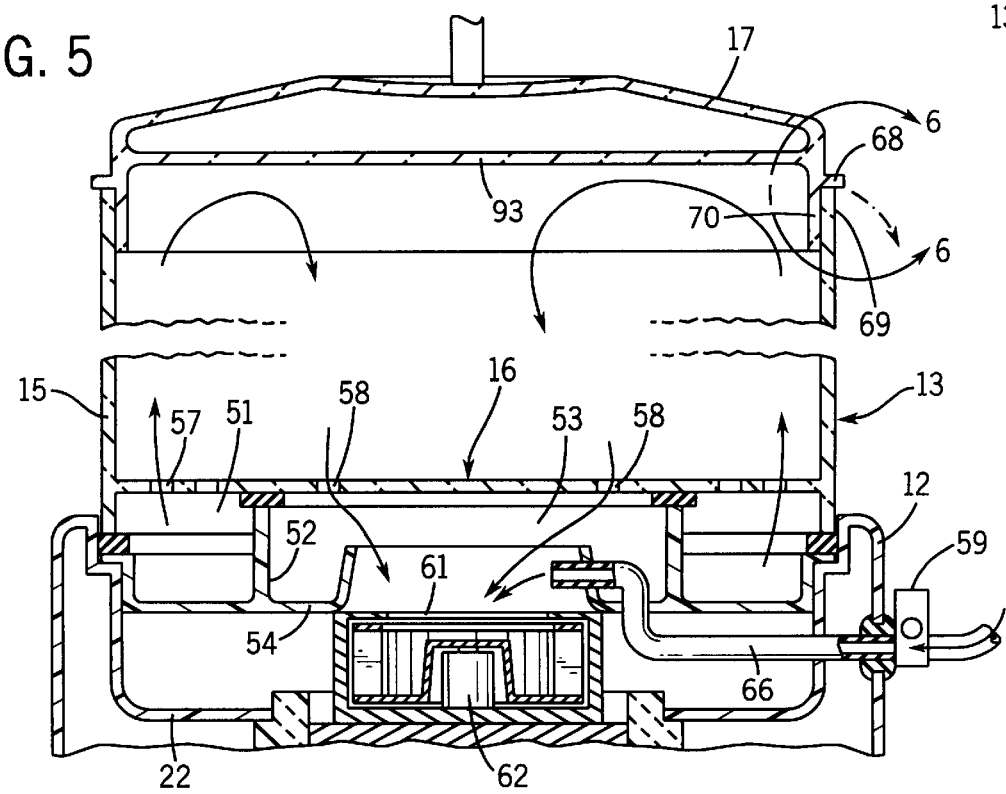
FIG. 5 is a sectional side elevational detail taken on line 5—5 of FIG. 2 and showing another embodiment of the invention.

Ripening fruit is known to emit ethylene gas and other by-products of organic decomposition. It may be desirable to exhaust these gases by regular or periodic replacement of the cooling air recirculating within the container 13. Referring particularly to FIG. 5, an ambient air conduit 66 comprising a small diameter metering tube extends from the side wall 23 of the base into the recirculation passage 56 where a small volume flow of ambient outside air is drawn in by the cold sink fan 62 and mixed with the recirculated cooling air. As shown, the ambient air conduit 66 opens into the recirculation passage 56 just upstream of the inlet to the fan 62. It is believed, however, that the conduit could connect to the recirculation passage at another location therein. The inflow of ambient air may be regulated with the use of an optional pinch valve 59 at the inlet end of the conduit 66. To provide for the corresponding exhaust of ethylene and other gaseous by-products, it is preferred to provide a small leak between the container 13 and the cover 17. As shown in the FIG. 6 detail, such a controlled leak may be provided by a small annular space 67 between the outer rim 70 of the cover and the top edge 69 of the container side wall 15. A horizontal supporting rim 68 on the cover seats on the upper edge of the container side wall, but is lifted by internal container pressure, thereby allowing small amounts of air to escape which are replenished with ambient air via the conduit 66.

Figure 7:
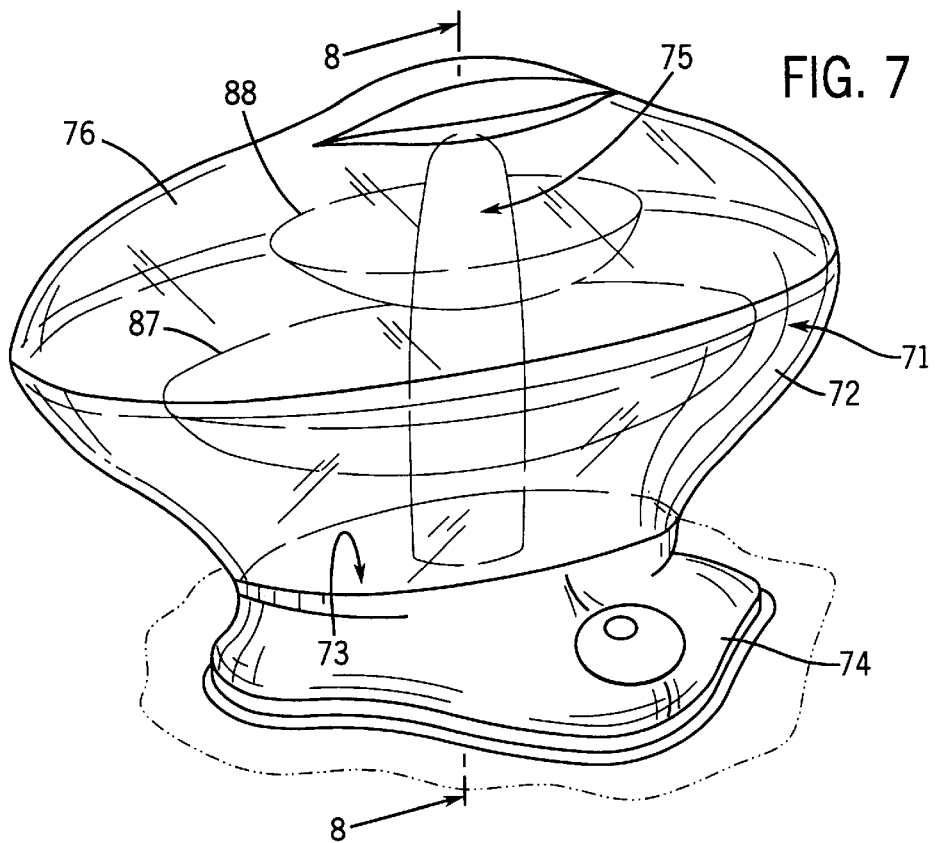
FIG. 7 is a perspective view of another embodiment of a fruit chiller in accordance with the subject invention.
Figure 8:
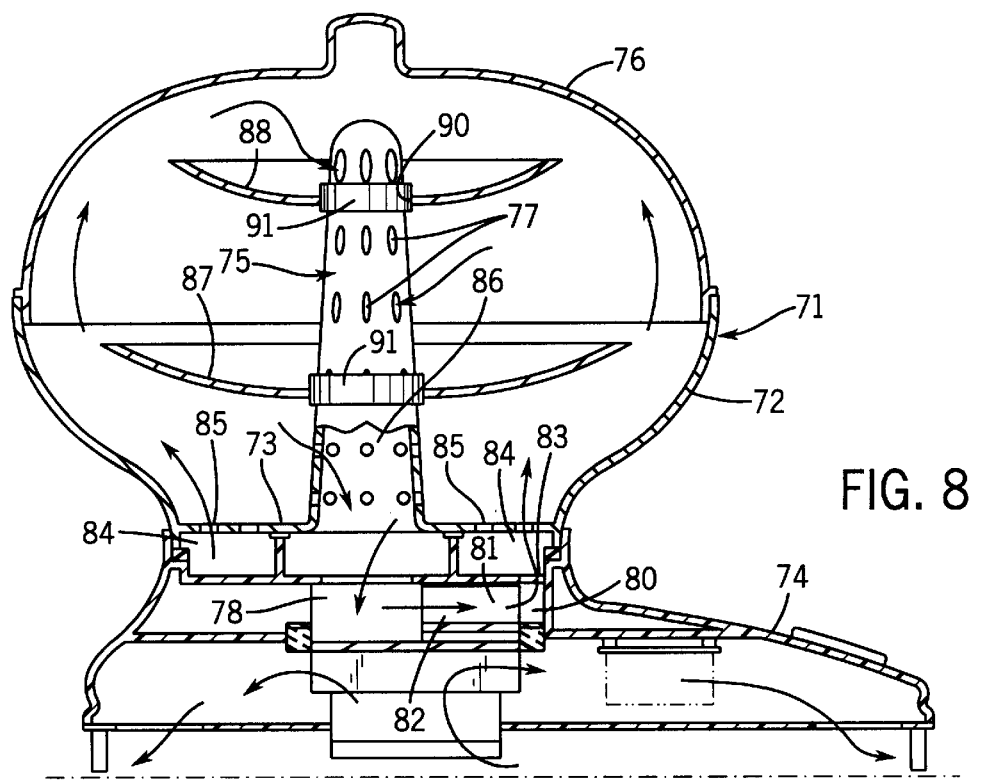
FIG. 8 is a vertical section taken on line 8—8 of FIG. 7.

In FIGS. 7 and 8, there is shown another embodiment of the invention that includes a container 71 that is more bowl shaped and has a tapering side wall 72 terminating in a generally flat bottom wall 73. The container 71 is removably supported on a base 74 which internally includes a thermoelectric module, an ambient cooling air chamber for the heat sink, and a cooling air duct system supplying recirculating cooled air to the container, all in a manner similar to the previously described embodiment.

In this embodiment, the container bottom wall 73 includes an integral hollow central tower 75 that extends vertically upwardly within the interior of the enclosing container side wall 72 and may extend into the space defined by a removable bowl shaped cover 76. The tower is provided with a plurality of holes 77 communicating with the hollow interior which holes may act as inlet holes for the flow of air to be recooled or outlet holes for cooled air being returned to the container, depending on the direction of operation of a cold sink fan 78 functioning as described with respect to the previous embodiment. Preferably, the holes 77 comprise outlet holes permitting air within the container 71 to be returned via fan 78 to a recirculation passage 80, past the fins 81 of a cold sink 82, back out through a return air duct outlet 83, into a cool air supply duct 84, from which the cooled air re-enters the container via a pattern of inlet holes 85 in the bottom wall 73. The interior of the tower 75 comprises a return air duct 86 which corresponds functionally to the return air duct 53 of the embodiment of FIGS. 1–4, but is substantially different in shape.

The use of a central tower 75 enhances cool air distribution throughout the container. By using a pattern of outlet holes 77 which increase in size as the distance of the holes increases from the inlet holes 85, a more uniform flow of air and thus a more uniform cooling of the entire interior of the tower 75 and cover 76 may be attained. This embodiment is still characterized by substantially shortened air flow paths and the elimination of flow paths from exposed exterior walls, all characteristic of the prior art. In particular, the total length of the tower 75 is less than one-half the circumference of domed chillers of the prior art having an air flow path in the outer spherical wall.

The center tower 75 is tapered from a larger diameter at its base to a smaller diameter at its free upper end. Fruit or other food products may be stored in the container 71, supported by the bottom wall 73 and side wall 72. In addition, one or more trays, including a larger diameter lower tray 87 and a small diameter upper tray 88 may be removably supported on the tower 75. Each of the trays is provided with a central through hole 90 by which the tray may be slid over the tower until it engages the tower surface of the same diameter as the through hole where it is retained in position. Preferably, the through holes 90 are defined by tapered sleeves 91 to enhance surface contact and support by the tower 75.

The removable trays 87 and 88 may also function as partitions which separate the interior of the container 71 into zones of varying temperature and/or for providing a baffle effect to vary the flow of air through the zones to effect varying levels of cooling. In this manner, different types of fruit or other food products, having different optimal storage temperatures, may be kept in the same container. To effect such a partitioning, the trays 87 and 88 may be made of a solid piece having no air holes therein, may be made with outer diameters selected to restrict the flow of cooling air upwardly from the cooled air inlet holes 85, or may be utilized with a tower having a different pattern of outlet holes 77. The fruit chiller 10 of the previously described embodiment of FIGS. 1–4 may be similarly partitioned, as with horizontal partitioning trays suitably supported on rims (not shown) on the interior side wall 15 of the container or by vertically disposed intermediate walls (not shown) extending upwardly from the bottom wall 16 of the container. Variations of the patterns of the inlet holes 57 and outlet holes 58 may also be used in conjunction with these auxiliary interior walls.

Another feature that is particularly adaptable for use with the embodiments described herein is a separate removable insulating sleeve 92, shaped to fit the interior surface of the container side wall 15 and to extend from the bottom wall 16 to the lowermost edge of the cover 17. The interior of the cover 17 may also be provided with an interior insulating layer 93 inserted separately into the interior of the cover after molding. The insulating sleeve 92 and the insulating layer 93 are particularly useful in maintaining the cool interior of the container after the container has been lifted from the base as for transport, display, or serving.

As indicated previously, the electronic module 40 is used to control the supply of power to the thermoelectric module 24, the heat sink fan 35 and the cold sink fan 62. Because reversal of the polarity of the current supplied to the thermoelectric module causes the direction of heat flow to be reversed, the fruit chillers of either of the embodiments described herein may also be utilized to warm the fruit to promote or enhance ripening.

Certain fruits may often be purchased in a green or semi-ripe condition. One example is bananas which are often purchased in some semi-ripe condition and allowed to ripen in the open air. By utilizing a controller 40 permitting the user to reverse the current and thus the heat flow, a green or semi-ripe fruit may be ripened more quickly by warming and, when ripe, preserved for a longer time by again reversing the current to provide a cooling air supply to the container 13 or 71.

In general, temperature control is an excellent and by far the best means of controlling ripening in fruit. As discussed above, warming may be used to enhance and promote ripening of green or semi-ripe fruit, but after the fruit has ripened, cooling is the best means available to slow the biological ripening processes and preserve the fruit for a longer period of time.

The electronic control module 40 may also utilize a thermostat to allow user control of the desired level of cooling and/or heating. In this manner, the user may, for example, select a set point to ripen fruits at a desirable rate or, conversely, a cooling set point to maintain ripened fruit at a temperature found to make the fruit most palatable. Other cooling or warming strategies may also be utilized, either with manual settings by the user or by using programmed microprocessor control.

We claim:

1. A food chiller comprising:

a supporting base including a housing in which is mounted a temperature control device comprising a Peltier effect thermoelectric module disposed between a cold sink and an opposite heat sink, said housing defining an upwardly opening cooling duct system, including a cool air supply duct receiving cooled air via a flow connection from said cold sink and a return air duct, a cool air circulation fan disposed in the cooling duct system to circulate air therethrough;

a food container supported on the housing, said container having an upper enclosing side wall above the housing and a lower bottom wall within said housing said bottom wall forming an enclosing top wall for said duct system and having formed therein a plurality of inlet holes communicating with said cool air supply duct and a plurality of outlet holes communicating with said return air duct, one of the ducts positioned to extend along an outer peripheral wall of the housing, and the other of said ducts centrally disposed within said one duct and separated therefrom by a generally vertically extending common dividing wall; and, said duct system further comprising a cool air duct inlet, a return air duct outlet, and a recirculation passage including said circulation fan and said cold sink and interconnecting said inlet and outlet.

2. The food chiller as set forth in claim 1 wherein the outer peripheral wall of the housing includes an upper peripheral edge and the container is supported on said peripheral edge.

3. The food chiller as set forth in claim 1 wherein said one duct comprises the cool air supply duct, said cool air supply duct has a lower enclosing wall forming a common separating wall with the recirculation passage disposed therebelow, and said cool air duct inlet is formed in said common separating wall adjacent the outer peripheral wall of the housing.

4. The food chiller as set forth in claim 3 wherein said return air duct outlet is formed in said common separating wall.

5. The food chiller as set forth in claim 1 wherein said container bottom wall includes a hollow central tower extending vertically upwardly within the enclosing side wall of said container, said central tower having formed therein one of said plurality of inlet holes and outlet holes.

6. The food chiller as set forth in claim 5 wherein said one of said plurality of inlet holes and outlet holes comprises a hole pattern of increasing hole size in an upwardly direction along said tower.

7. The food chiller as set forth in claim 5 including a removable cover enclosing the container and wherein the height of said tower is less than one-half the interior circumference of the container and cover.

8. The food chiller as set forth in claim 5 comprising an auxiliary food tray demountably supported on said central tower above the container bottom wall.

9. The food chiller as set forth in claim 5 wherein said central tower is tapered to decrease in diameter in the upward direction, and further comprising an auxiliary food tray having a center through hole adapted to receive said central tower for demountable support thereon intermediate the base and upper end of said tower.

10. The food chiller as set forth in claim 1 wherein said duct system includes a lower enclosing wall forming a common separating wall with the recirculation passage disposed therebelow, and one of said cool air duct inlet and return air duct outlet is formed in said common separating wall adjacent the outer peripheral wall of the housing.

11. The food chiller as set forth in claim 10 wherein the plurality of holes formed in the enclosing top wall of the duct that extends along the outer peripheral wall of the housing comprises a hole pattern of increasing hole size with increasing distance from said one of said duct inlet and duct outlet.

12. The food chiller as set forth in claim 11 wherein the duct that extends along the outer peripheral wall of the housing comprises the cool air supply duct.

13. The food chiller as set forth in claim 10 wherein the other of said cool air duct inlet and return air duct outlet is formed in said common separating wall in the center thereof.

14. The food chiller as set forth in claim 13 wherein said pluralities of inlet holes and outlet holes are interrupted to define solid wall portions overlying said cool air duct inlet and said return air duct outlet and covering the same from the ingress of debris.

15. The food chiller as set forth in claim 1 wherein the food container is removable from the housing and includes an annular outer edge seal between an upper peripheral edge of the housing supporting the container and the lower edge of the enclosing side wall of the container and an annular inner seal between the upper edge of the common dividing wall and the underside of the container bottom wall.

16. The food chiller as set forth in claim 15 wherein said outer and inner seals are secured to the container.

17. The food chiller as set forth in claim 1 wherein the container is closed with a removable cover, and further comprising an outside ambient air supply conduit communicating with said recirculation passage, said air supply conduit including a metering device to admit a controlled flow of outside air.

18. The food chiller as set forth in claim 17 wherein said metering device comprises a small diameter tube connected to said recirculation passage upstream of the fan.

19. The food chiller as set forth in claim 17 wherein said metering device is adjustable to vary the flow of outside air admitted into the container.

20. The food chiller as set forth in claim 1 comprising an insulating sleeve removably insertable into said container and shaped to conform to said enclosing side wall.

21. The food chiller as set forth in claim 20 including an insulated removable cover for said container.

22. The food chiller as set forth in claim 1 including partition means disposed within the container for dividing the container into different temperature zones and for varying the flow of air through said zones to effect varying levels of cooling therein.

23. The food chiller as set forth in claim 1 and further including a power supply, and an electronic control, said electronic control adapted to provide user control of electric current from said power supply to reverse the flow of heat through said thermoelectric module, whereby food in said container may be selectively warmed and cooled.

24. The food chiller as set forth in claim 23 wherein said electronic control includes a thermostatic device adapted to permit the user to set a selected level of warming and cooling.

25. A food chiller comprising:
a housing in which is mounted a cooling device comprising a Peltier effect thermoelectric module disposed between a cold sink and an opposite heat sink, said housing defining an upwardly opening cooling duct system, including a cool air supply duct in heat transfer communication with said cold sink and a return air duct, a cool air circulation fan disposed in the cooling duct system to circulate air therethrough;
a food container supported on an upper peripheral edge of the housing, said container having an upper enclosing side wall above said peripheral edge and a generally horizontal lower bottom wall within said peripheral edge, said bottom wall forming an enclosing top wall for said duct system and having formed therein a plurality of inlet holes communicating with said cool air supply duct and a plurality of outlet holes communicating with said return air duct, the cool air supply duct positioned to extend along an outer peripheral wall of the housing including said peripheral edge, and the return air duct centrally disposed within said cool air supply duct and separated therefrom by a generally vertically extending common dividing wall; and,
said duct system further comprising a cool air duct inlet, a return air duct outlet, and a recirculation passage including said circulation fan and said cold sink and interconnecting said inlet and outlet.

26. A food chiller as set forth in claim 25 and further comprising:
a supporting base for the housing defining an ambient cooling air chamber below and separated from the cooling duct system; and,
a heat sink fan mounted in said air chamber in communication with said heat sink and between an ambient air inlet in a chamber wall and an ambient air outlet to move ambient cooling air over the heat sink.

27. The food chiller as set forth in claim 25 wherein said cool air supply duct and said return air duct have a common lower enclosing wall forming a separating wall with the recirculation passage disposed therebelow, and said cool air duct inlet is formed in said common separating wall adjacent the outer peripheral wall of the housing, and said return air duct outlet is formed in said common separating wall generally in the center thereof.

28. A food chiller comprising:
a housing in which is mounted a cooling device comprising a Peltier effect thermoelectric module disposed between a cold sink and an opposite heat sink, said housing defining an upwardly opening cooling duct system, including a cool air supply duct in heat transfer communication with said cold sink and a return air duct, a cool air circulation fan disposed in the cooling duct system to circulate air therethrough; and, a food container supported on an upper peripheral edge of the housing, said container having an upper enclosing side wall above said peripheral edge and a generally horizontal lower bottom wall within said peripheral edge, said bottom wall forming an enclosing top wall for said duct system and having formed therein a plurality of inlet holes communicating with said cool air supply duct and a plurality of outlet holes communicating with said return air duct, said cool air supply duct and said return air duct having a common lower enclosing wall forming a separating wall with a recirculation passage disposed therebelow, and a cool air duct inlet formed in said common separating wall adjacent the outer peripheral wall of the housing, and a return air duct outlet is formed in said common separating wall generally in the center thereof.

29. A food chiller comprising:

a supporting base including a housing in which is mounted a temperature control device comprising a Peltier effect thermoelectric module disposed between a cold sink and an opposite heat sink, said housing defining an upwardly opening cooling duct system, including a cool air supply duct receiving cooled air via a flow connection from said cold sink and a return air duct, a cool air circulation fan disposed in the cooling duct system to circulate air therethrough;

a food container supported on the housing, said container having an upper enclosing side wall above the housing and a lower bottom wall within said housing said bottom wall forming an enclosing top wall for said duct system and having formed therein a plurality of inlet holes communicating with said cool air supply duct and a plurality of outlet holes communicating with said return air duct, one of the ducts positioned to extend along an outer peripheral wall of the housing, and the other of said ducts centrally disposed within said one duct and separated therefrom by a generally vertically extending common dividing wall;

said duct system further comprising a cool air duct inlet, a return air duct outlet, and a recirculation passage including said circulation fan and said cold sink and interconnecting said inlet and outlet; and, wherein the plurality of holes formed in the enclosing top wall of the duct that extends along the outer peripheral wall of the housing comprises a hole pattern of increasing hole size with increasing distance from said one of said duct inlet and duct outlet.

30. A food chiller comprising:

a supporting base including a housing in which is mounted a temperature control device comprising a Peltier effect thermoelectric module disposed between a cold sink and an opposite heat sink, said housing defining an upwardly opening cooling duct system, including a cool air supply duct receiving cooled air via a flow connection from said cold sink and a return air duct, a cool air circulation fan disposed in the cooling duct system to circulate air therethrough;

a food container supported on the housing, said container having an upper enclosing side wall above the housing and a lower bottom wall within said housing said bottom wall forming an enclosing top wall for said duct system and having formed therein a plurality of inlet holes communicating with said cool air supply duct and a plurality of outlet holes communicating with said return air duct, one of the ducts positioned to extend along an outer peripheral wall of the housing, and the other of said ducts centrally disposed within said one duct and separated therefrom by a generally vertically extending common dividing wall;

said duct system further comprising a cool air duct inlet, a return air duct outlet, and a recirculation passage including said circulation fan and said cold sink and interconnecting said inlet and outlet; and, wherein said pluralities of inlet holes and outlet holes are interrupted to define solid wall portions overlying said cool air duct inlet and said return air duct outlet and covering the same from the ingress of debris.

31. A food conditioning apparatus comprising:

a supporting base including a housing in which is mounted a temperature control device comprising a Peltier effect thermoelectric module disposed between a cold sink and an opposite heat sink, said housing defining an upwardly opening air duct system, including a conditioned air supply duct receiving conditioned air via a flow connection from one of said sinks and a return air duct, an air circulation fan disposed in the air duct system to circulate air therethrough;

a food container supported on the housing, said container having an upper enclosing side wall above the housing and a lower bottom wall within said housing said bottom wall forming an enclosing top wall for said duct system and having formed therein a plurality of inlet holes communicating with said conditioned air supply duct and a plurality of outlet holes communicating with said return air duct, one of the ducts positioned to extend along an outer peripheral wall of the housing, and the other of said ducts centrally disposed within said one duct and separated therefrom by a generally vertically extending common dividing wall; and, said duct system further comprising a conditioned air duct inlet, a return air duct outlet, and a recirculation passage including said circulation fan and one of said sinks and interconnecting said inlet and outlet.

32. The apparatus as set forth in claim 31 including a controller for said thermoelectric module operative to apply electric current thereto of a polarity selected to provide conditioned air that is cooled or heated.

* * * * *